(12) United States Patent
Hayes et al.

(10) Patent No.: US 6,843,746 B2
(45) Date of Patent: Jan. 18, 2005

(54) DUAL LEVEL INVERTED PORTAL AXLE LUBRICATION CONFIGURATION

(75) Inventors: Brian David Hayes, Newark, OH (US); Tomaz Dopico Varela, Gahanna, OH (US); William C. Sullivan, Newark, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 81 days.

(21) Appl. No.: 10/429,317

(22) Filed: May 5, 2003

(65) Prior Publication Data

US 2004/0224809 A1 Nov. 11, 2004

(51) Int. Cl.$^7$ ............................................... F16H 57/04
(52) U.S. Cl. ........................ 475/160; 74/607; 184/6.12
(58) Field of Search .......................... 475/160; 74/607; 184/6.12, 13.1, 11.2, 11.1

(56) References Cited

U.S. PATENT DOCUMENTS

| | | | |
|---|---|---|---|
| 4,217,794 A | | 8/1980 | Yasui et al. |
| 4,242,923 A | | 1/1981 | Nishikawa et al. |
| 4,244,242 A | | 1/1981 | Uno et al. |
| 4,261,219 A | | 4/1981 | Suzuki et al. |
| 4,319,499 A | | 3/1982 | Sanui et al. |
| 4,352,301 A | * | 10/1982 | Fleury .......................... 74/467 |
| 4,468,981 A | * | 9/1984 | Ries ........................... 475/225 |
| 5,197,929 A | * | 3/1993 | Scheiber et al. ............. 475/160 |
| 5,535,850 A | * | 7/1996 | Tar et al. ..................... 184/6.12 |

* cited by examiner

*Primary Examiner*—Dirk Wright
(74) *Attorney, Agent, or Firm*—Carlson, Gaskey & Olds

(57) ABSTRACT

An axle system includes an axle lubrication level within an axle housing which is lower than a wheel end lubrication level within the wheel end assemblies. An opening through the wheel end assembly housing provides a fluid communication path between the wheel end assembly and the axle housing. A differential assembly rotates adjacent an opening such that lubrication at the wheel end lubrication level is rotated into the opening. The lubricant within the wheel end assemblies is maintained at the wheel end lubrication level. The shaft enters the wheel end assembly housing through a shaft opening which provides a communication path for the lubricant from the wheel end assembly back into the axle housing.

19 Claims, 3 Drawing Sheets

DUAL LEVEL INVERTED PORTAL AXLE LUBRICATION CONFIGURATION

BACKGROUND OF THE INVENTION

The present invention relates to an inverted portal axle configuration, and more particularly to a lubrication system therefore.

Mass transit vehicles, such as trolley cars, buses, and the like typically have seats aligned at the lateral sides of the vehicle, with a central aisle and floor extending along the vehicle. In order to facilitate entering and exiting from the vehicle, it is desirable to have the vehicle floor and aisle positioned relatively low to the ground. This provides faster cycle time at bus stops.

Many such vehicles provide a rigid axle having a gear box at each longitudinal end to form an inverted portal axle configuration. The inverted portal axle configuration is particularly effective in providing a low floor vehicle.

Disadvantageously, the inverted portal axle configuration requires a relatively large volume of lubricant within the axle. The large volume of lubricant requires the rotating shaft within the rigid axle to be almost completely immersed to provide an adequate lubricant level within the wheel end. Such a relatively large volume of lubricant adds significantly to the axle weight. In some instances, vehicle operation may force lubricant out of the wheel ends and into the axle which may result in spinout damage to the wheel end gear train.

Accordingly, it is desirable to provide an inverted portal axle configuration which assures a proper quantity of oil in both the wheel ends and the axle, while reducing the total quantity of oil and maintain a low floor profile to improve vehicle access.

SUMMARY OF THE INVENTION

An inverted portal axle system according to the present invention includes a differential carrier assembly which drives an axle assembly. The axle assembly includes a short half-shaft and a long half-shaft. The present invention provides an axle lubrication level within an axle housing which is lower than a lubrication level within a wheel end assemblies. That is, lubrication within the inverted portal axle system is maintained at a dual level.

An input drives a ring gear within the differential carrier assembly. The ring gear drives a pinion gear set that is coupled to the half-shafts so that torque is transmitted to both gear reducers within the wheel end assemblies. A differential support case supports the ring gear and rotates therewith. The differential support case rotates adjacent an opening such that lubrication at the wheel end lubrication level is rotated into the opening.

The lubricant within the wheel end assemblies is maintained at a level at which the shaft enters the wheel end assembly housing. The shaft enters the wheel end assembly housing through a shaft opening which provides a communication path for the lubricant from the wheel end assembly back into the axle housing.

The non-differential side of the inverted portal axle system includes a slinger which is attached to the long half-shaft to rotate adjacent an opening such that lubrication at the wheel end lubrication level is rotated into the opening as described with the differential side.

The present invention therefore provides an inverted portal axle configuration which assures a proper quantity of oil in both the wheel ends and the axle, while reducing the total quantity of oil and maintain a low floor profile to improve vehicle access.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
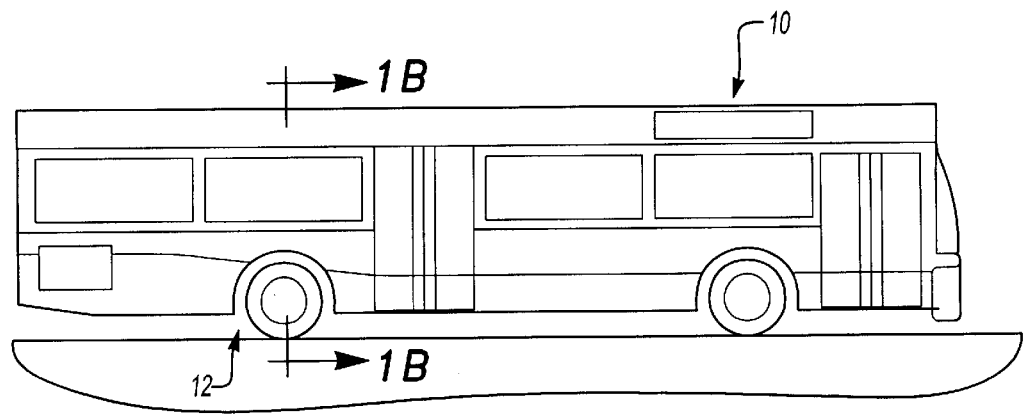
FIG. 1A is a schematic view of a vehicle utilizing the axle assembly designed according to the present invention.
Figure 1B:
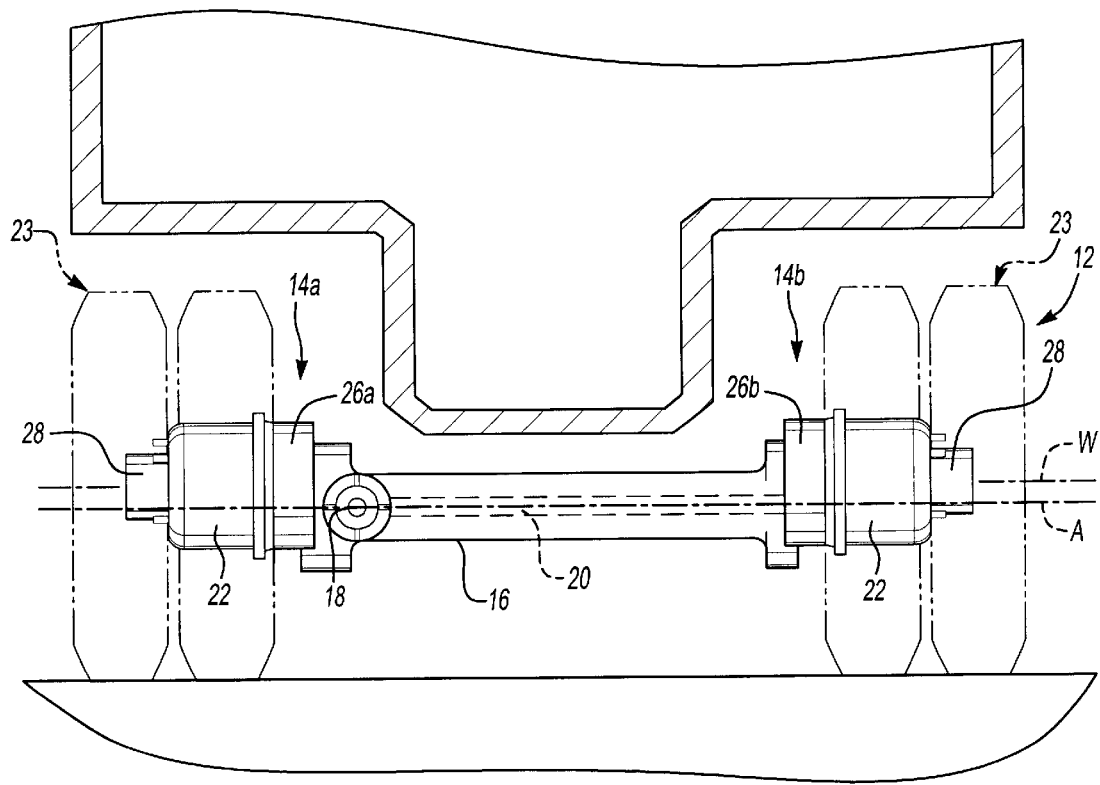
FIG. 1B another view of the suspension system of FIG. 1A.

FIGS. 1A and 1B schematically illustrate a vehicle 10 incorporating an inverted portal axle system 12. The inverted portal axle 12 includes a pair of wheel end assemblies 14A, 14B interconnected by an axle housing 16. An input 18 is positioned near one of the wheel end assemblies 14A, 14B and a shaft assembly 20 connects the input 18 to the other wheel end assembly 14A, 14B. The shaft 20 defines an axle axis of rotation A.

Each wheel end assembly 14A, 14B includes a wheel hub assembly 22 driven by a gear reduction (illustrated schematically at 26A,26B). The gear reduction 26A,26B drives a spindle 28 (also illustrated in FIG. 2) which drives the wheel hub assembly 22 and tires 23. The gear reduction 26A, 26B includes gearing to transfer the torque from the axle assembly 20 to the spindle 28 through the gear reduction 26A, 26B. The spindles 28 defines a wheel axis of rotation W. The wheel axis of rotation W is higher relative to the ground than the axle axis of rotation A. Tires 23 are mounted for rotation with the hub assemblies 22 as generally known.

Figure 2:
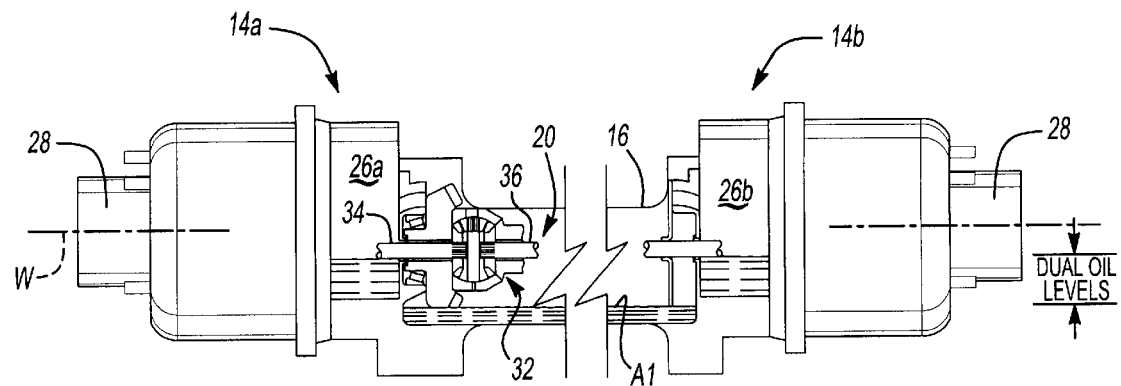
FIG. 2 is a schematic sectional view of an axle assembly illustrating a lubricant level.

Referring to FIG. 2, the inverted portal axle system 12 includes a differential assembly (illustrated schematically at 32) which drives the shaft assembly 20. The axle assembly 20 preferably includes a short half-shaft 34 (differential side) and a long half-shaft 36 (opposite differential side). It should be understood that the terms "long" and "short" are relative terms utilized for descriptive purposes and other shaft lengths, including equal length half-shafts, prop shafts and other rotating members, will benefit from the present invention.

The short half-shaft 34 drives the gear reduction 26A and the long half-shaft 36 drives the gear reduction 26B. The present invention provides an axle lubrication level A1 within the axle housing 16 which is lower than a wheel end lubrication level W1 within the wheel end assemblies 14A, 14B. That is, lubrication within the inverted portal axle system 12 is maintained at a dual level. It should be further understood that additional drive train components may also benefit from the instant invention.

Figure 3:
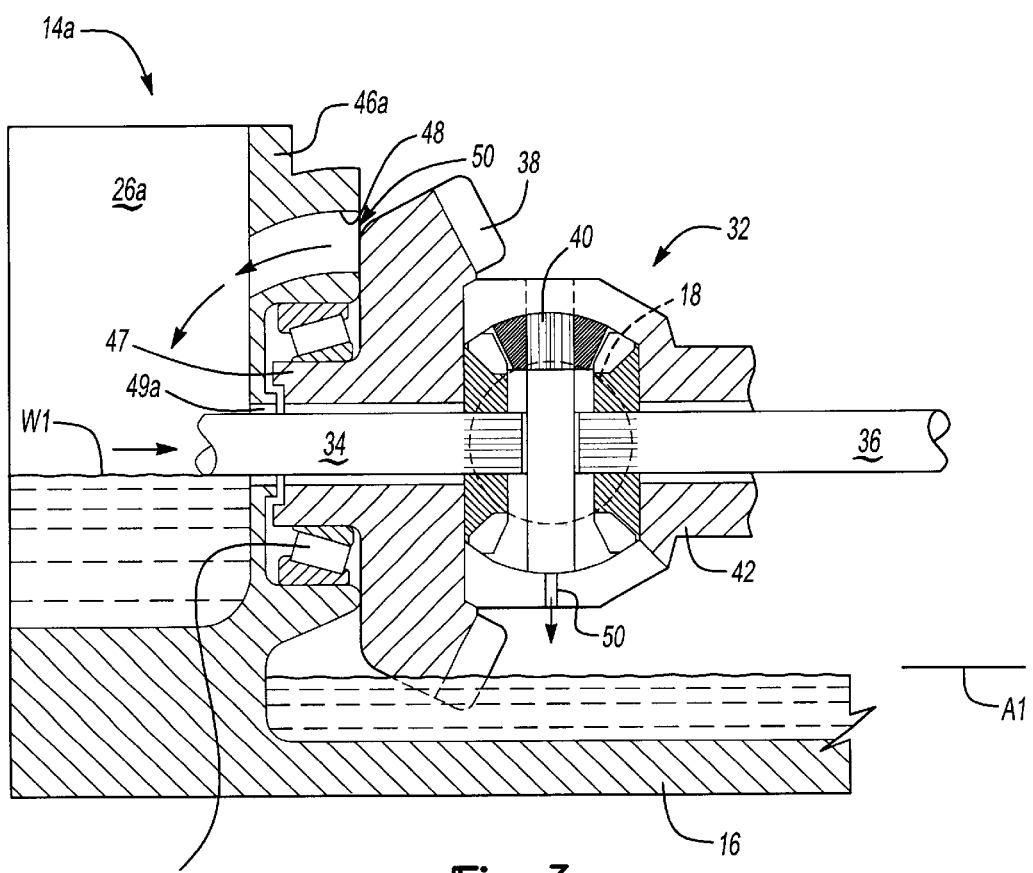
FIG. 3 is a sectional view of the differential side of a wheel end assembly housing of the axle system of FIG. 2.

Referring to FIG. 3, the input 18 preferably drives a ring gear 38 within the differential carrier assembly 32. The ring gear 38 drives a pinion gear set 40 that is coupled to the shaft assembly 20 so that torque is transmitted to both gear reduction 26A, 26B within the wheel end assemblies 14A, 14B (FIG. 2). A differential support case 42 supports the ring gear 38 and rotates therewith. The pinion gear set 40 rotates relative the differential support case 42.

A bearing 44 rotationally supports the differential support case 42 and attached ring gear 38 adjacent the wheel end assembly housing 46A. An opening 48 through a wheel end assembly housing 46A provides a fluid communication path between the wheel end assembly 14A and the axle housing 16. The differential support case 42 rotates adjacent the opening 48 such that lubrication at the wheel end lubrication level W1 is rotated in to the opening 48. Preferably, the differential support case 42 is relatively close to a face 50 of the opening 48 such that the opening 48 operates as a scraper to intake lubricant into the opening 48. Moreover, as the ring gear 38 is attached to the differential support case 42, a paddle wheel like effect is produced by the ring gear 38 to communicate a relatively large quantity of lubricant to the opening.

The lubricant within the wheel end assemblies 14A, 14B is maintained at the wheel end lubrication level W1. The wheel end lubrication level W1 is preferably the level at which the short half-shaft 34 enters the wheel end assembly housing 46A. That is, the short half-shaft 34 enters the wheel end assembly housing 46A through an axle opening 49A which also provides a communication path for the lubricant from the wheel end assembly 14A back into the axle housing 16.

A radial communication passage 47 extends from the axle opening 49A to the bearing 44 such that lubricant is slung into the bearing 44 in addition to traveling along the short half-shaft 34 and into the differential support case 42. The lubricant within the differential support case 42 lubricates the pinion gear set 40 and then is slung out of the differential support case 42 through a differential support case aperture 50. It should be understood that multiple differential support case aperture 50 will benefit form the present invention and that the lubricant may alternatively or additionally exit from other locations.

Figure 4:
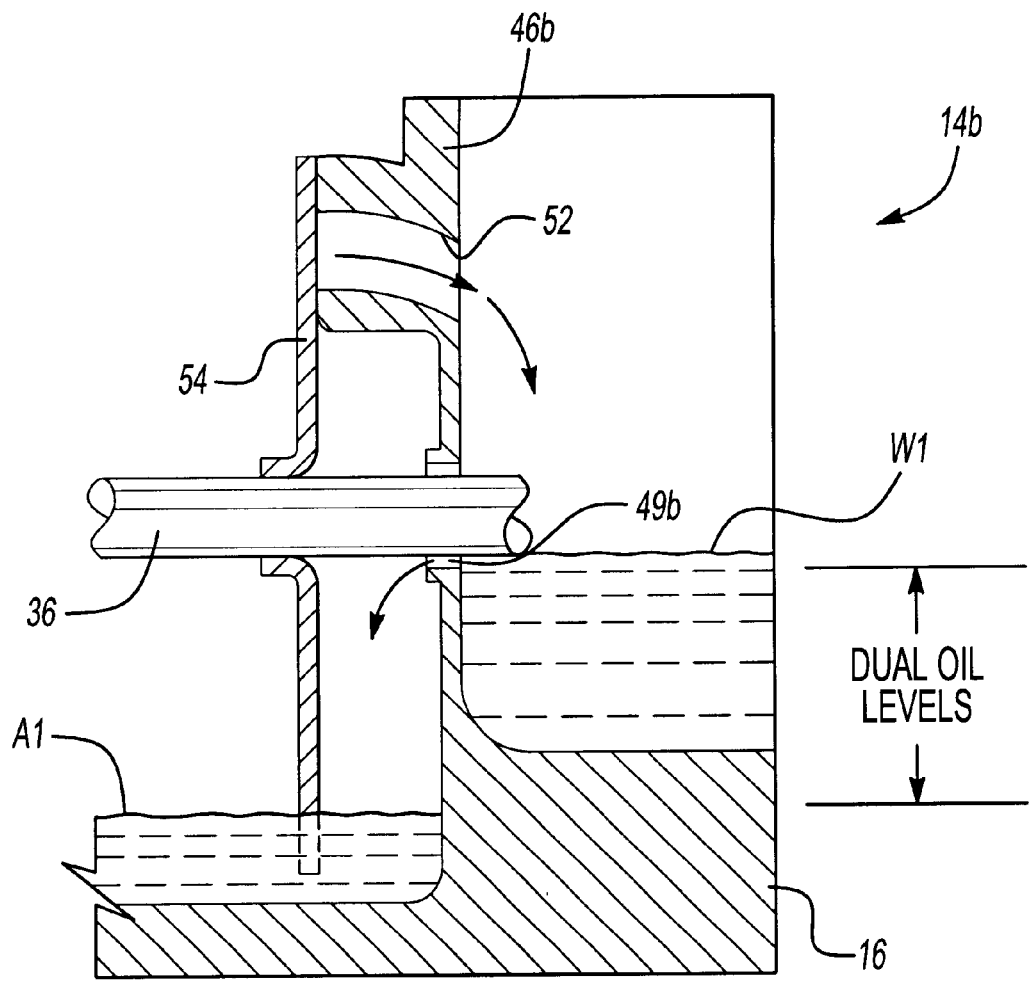
FIG. 4 is a sectional view of the non-differential side of a wheel end assembly housing of the axle system of FIG. 2.

Referring to FIG. 4, the non-differential side of the inverted portal axle system 12 is illustrated. An opening 52 through the wheel end assembly housing 46B provides a fluid communication path between the wheel end assembly 14B and the axle housing 16. A slinger 54 is preferably attached to the long half-shaft 36 to rotate adjacent the opening 52 such that lubrication at the wheel end lubrication level W1 is rotated into the opening 50 as described with the differential side (FIG. 3). It should be understood that various slinger configurations such as round plates, apertured plates, and/or paddle like members will benefit from the present invention.

The wheel end lubrication level W1 of the wheel end assembly housing 46B is preferably the level at which the long half-shaft 36 enters the wheel end assembly housing 46B. That is, the long half-shaft 36 enters the wheel end assembly housing 46B through an axle opening 49B which also provides a communication path for the lubricant from the wheel end assembly 14B back into the axle housing 16. The axle opening 49B defines the height of the wheel end lubrication level W1.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An axle assembly comprising:
   a first wheel end assembly containing a lubricant, said lubricant maintained at a first wheel end lubrication level;
   a second wheel end assembly, said second wheel end assembly maintaining said lubricant at a second wheel end lubrication level; and
   an axle housing connected to said first and second wheel end assembly, said axle housing containing said lubricant at an axle lubrication level, said axle lubrication level different than said first wheel end lubrication level and said second wheel end lubrication level.

2. An axle assembly as recited in claim 1, further comprising a differential carrier assembly mounted within said axle housing.

3. An axle assembly as recited in claim 2, wherein said differential carrier assembly comprises a ring gear rotationally mounted adjacent an opening through a wheel end assembly housing of said first wheel end assembly.

4. An axle assembly as recited in claim 2, wherein said differential carrier assembly comprises a differential support case rotationally mounted adjacent an opening through a wheel end assembly housing of said first wheel end assembly.

5. An axle assembly as recited in claim 4, wherein said differential carrier assembly comprises a differential support case aperture.

6. An axle assembly as recited in claim 1, further comprising a shaft which extends through an shaft opening within a first wheel end assembly housing.

7. An axle assembly as recited in claim 6, wherein said lubricant communicates between said first wheel end assembly and said shaft assembly through said shaft opening.

8. An axle assembly as recited in claim 7, further comprising a radial communication passage between said shaft opening and a bearing.

9. An axle assembly as recited in claim 1, wherein said first wheel end lubrication level is defined by a shaft opening.

10. An axle assembly as recited in claim 1, further comprising a second shaft which extends through a shaft opening within a second wheel end assembly housing.

11. An axle assembly as recited in claim 10, further comprising a slinger mounted to said second shaft.

12. An axle assembly as recited in claim 1, wherein said first wheel end lubrication level is equivalent to said second wheel end lubrication level.

13. An axle assembly comprising:
   a wheel end assembly housing containing a lubricant, said lubricant maintained at a first wheel end lubrication level;
   an axle housing connected to said wheel end housing, said axle housing maintaining said lubricant at an axle lubrication level;
   a differential assembly rotationally mounted adjacent an opening through said wheel end assembly housing, said differential assembly communicating lubricant from said axle lubrication level to said opening; and a shaft extending from said differential support case through a shaft opening within said wheel end assembly, said shaft opening communicating said lubricant from said wheel end assembly housing into said axle housing.

14. An axle assembly as recited in claim 13, wherein said differential assembly comprises a differential support case and a ring gear rotationally mounted adjacent said opening.

15. An axle assembly as recited in claim 14, wherein said differential support case comprises a differential support case aperture.

16. An axle assembly as recited in claim 13, further comprising a radial communication passage between said shaft opening and a bearing.

17. An axle assembly as recited in claim 13, further comprising a second shaft extending from said differential assembly, said second shaft extending through an opening within a second wheel end assembly housing.

18. An axle assembly as recited in claim 17, further comprising a slinger mounted to said second shaft, said slinger communicating lubricant from said axle lubrication level to said opening within said second wheel end assembly housing.

19. An axle assembly as recited in claim 18, wherein said slinger comprises a round plate.

* * * * *